L. A. ASPINWALL.
POTATO DIGGER.
APPLICATION FILED FEB. 4, 1919.

1,319,505.

Patented Oct. 21, 1919.
2 SHEETS—SHEET 1.

INVENTOR
Lewis Augustus Aspinwall

HIS ATTORNEY

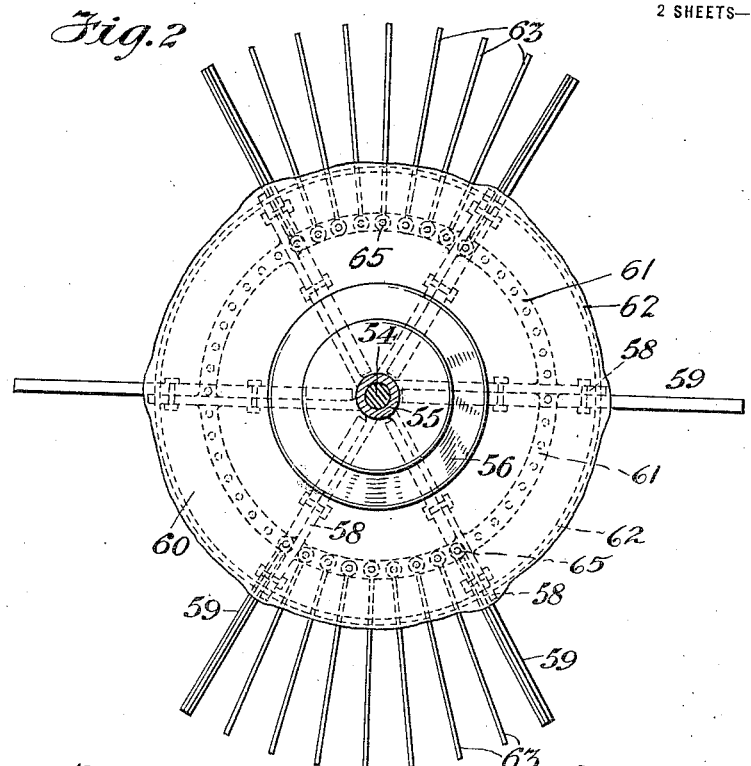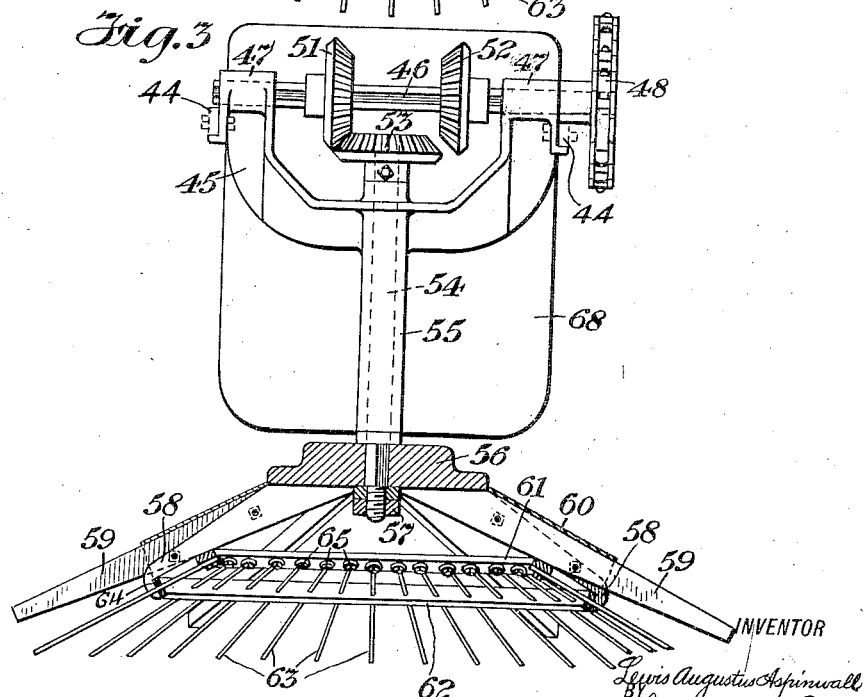

UNITED STATES PATENT OFFICE.

LEWIS AUGUSTUS ASPINWALL, OF JACKSON, MICHIGAN, ASSIGNOR TO ASPINWALL MFG. CO., A CORPORATION OF MICHIGAN.

POTATO-DIGGER.

1,319,505.  Specification of Letters Patent.  Patented Oct. 21, 1919.

Application filed February 4, 1919. Serial No. 274,876.

*To all whom it may concern:*

Be it known that I, LEWIS AUGUSTUS ASPINWALL, a citizen of the United States, residing at Jackson, in the county of Jackson and State of Michigan, have invented an Improvement in Potato-Diggers, of which the following is a specification.

This invention relates to a potato digger, and more particularly to the elevator type of potato digger in which the potatoes are removed from the ground by a suitable plow by which they are carried to a conveyer whereon the earth is loosened and removed from the potatoes by the agitation of the same, and the potatoes and vines delivered at a suitable point. In a copending application, Serial No. 274,875, filed Feb. 4, 1919, for Letters Patent for an improvement in potato diggers, I have described and specifically claimed the features of my improved digger relating to the conveyer and the means for driving and agitating the same. The present invention relates more particularly to the devices for delivering the potatoes so as to deposit them in predetermined rows at either side of the digger. The present invention therefore includes a receiving plate upon which the potatoes and vines are delivered from the conveyer and revoluble devices moving in the receiving plate and by which the potatoes and also the vines are removed from the digger so as to be deposited in predetermined rows as hereinbefore stated on either side of the apparatus, and these delivery devices comprising the present invention will be hereinafter more particularly described.

In the drawing:

Fig. 2 is a partial inverted plan on an enlarged scale of the revoluble member comprising the delivery devices, and Fig. 3 is an enlarged sectional elevation of the revoluble delivery member and the parts associated therewith.

Figure 1:
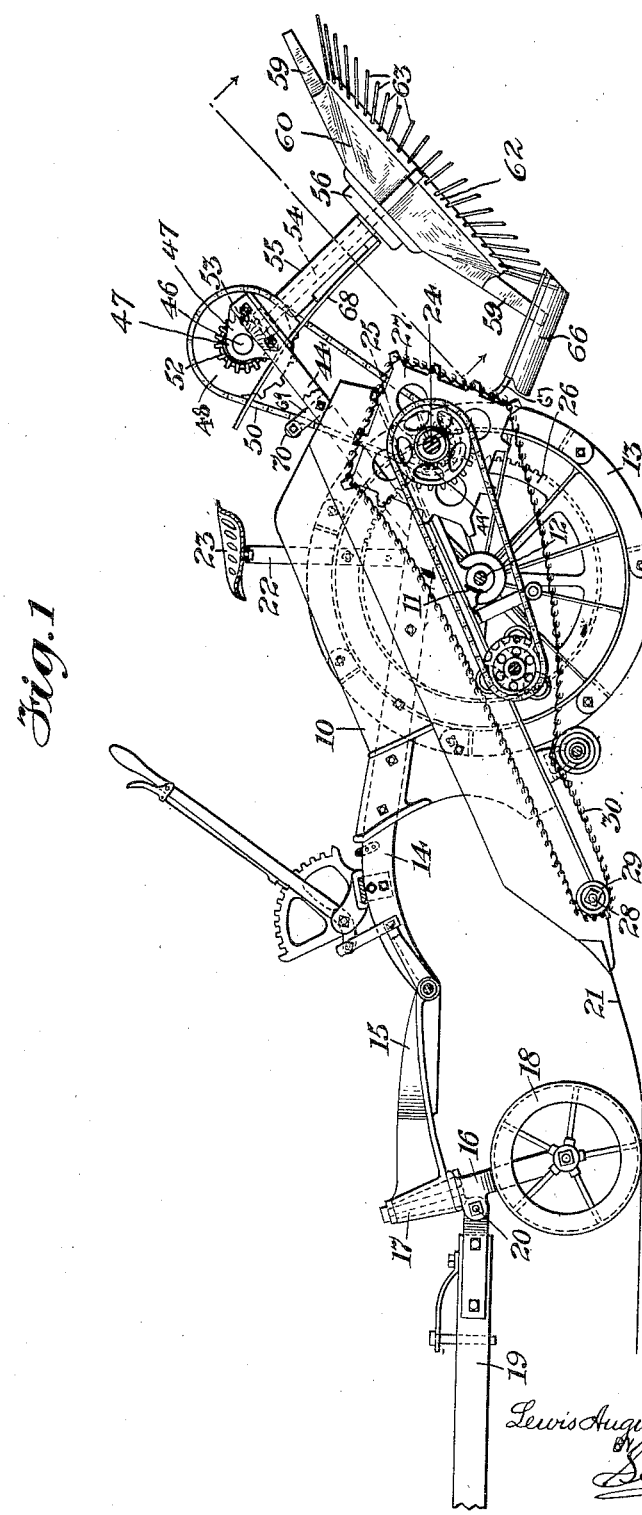
Figure 1 is a longitudinal sectional elevation of a potato digger including the delivery devices comprising the present invention.

Referring to the drawing, the potato digger in which are the delivery devices comprising the present invention, may be so made as to include side members 10, constructed of suitable material and connected by braces so as to maintain a relative fixed relationship to each other. In the lower portions of each of the side members 10 there are bearings 11 in which the axle 12 of the digger is journaled. On this axle 12 exteriorly of the sides, the traction wheels 13 are fixed. Extending from the upper forward portion of the side members 10 there are truss bars 14 and a swivel plate 15 is pivotally mounted between the forward ends of the truss bars 14. A yoke axle 16 is pivotally mounted at the forward end of the swivel plate 15 as indicated at 17 and the front wheels 18 are suitably mounted on the yoke axle 16. 19 represents a draft pole which may be suitably connected to the yoke axle 16 on the pivotal point as indicated at 20. The digger also includes a plow 21 secured in the lower forward ends of the side members 10 as well as a seat post mounted in the side members and carrying a seat 23 for the driver.

Journaled in the bearings provided therefor in the side members 10 there is a shaft 24. Mounted on this shaft 24 exteriorly of the side members there are gears 25, and meshing with each gear 25 is a gear 26 which as will be understood may be fixed on the axle 11 or suitably connected to the wheels 13 or secured to both the axle and the wheels so that through the wheels 13 and the axle 11, the gears 26 turn the gears 25 to revolve the shaft 24. On the shaft 24 immediately within the side members, there are sprocket wheels 27. In journals provided therefor in the lower front portions of the side members 10, there are mounted stub shafts 28. On these stub shafts 28 immediately within the side members 10 there are rollers 29. Passing over the rollers 29 and the sprockets 27 there is an endless conveyer 30.

The delivery devices comprise support bars 44 which are suitably connected to and extend rearwardly from the side members 10. Extending between and secured to the extremities of these support bars 44 there is a cross frame 45. A shaft 46 is journaled in bearings 47 forming part of the cross frame 45, and also mounted on the shaft 46 is a sprocket 48 by which through a sprocket 49 mounted on the shaft 24 and a chain 50 the shaft 46 is revolved to operate the delivery devices. Also mounted on the shaft 46 so as to turn therewith and slide thereon are beveled gears 51 and 52. These gears as will be understood may be suitably connected and operated simultaneously by a suitable clutch mechanism so that either gear may be made to mesh with a gear 53 secured at the upper end of a spindle 54 which passes through and is journaled in a sleeve 55 depending from the cross frame 45. At the lower end of the spindle 54, a head member 56 is secured by means of suitable lock nuts 57 or otherwise, and extending in spaced positions from the head 56 there are projections 58. Bolted or otherwise secured to each of the projections 58 there is an arm 59 which extends an appreciable distance beyond the extremity of the projection to which it is connected. These arms 59 are provided with a suitable cover of canvas or other material which preferably extends from the head 56 to approximately the ends of the projections 58. Suitably connected to the projections 58 there are ring members indicated at 61 and 62. Associated with and secured to these rings, I employ a series of projecting fingers 63. These fingers may be metal rods or any other suitable devices to answer their purposes. Each finger 63 extends through an aperture 64 provided therefor in the outer ring member 62 and at its inner end is provided with a loop to receive a bolt and nut 65 by which this inner end of the finger is secured to the inner ring 61. Also as clearly indicated in Fig. 1, it will be noted that the extending portions of the arms 59 and the fingers 63 are at different angles, and that the fingers 63 extend an appreciable distance beyond the ends of the arms 59.

Associated with these parts, I also employ a receiving plate 66 which is preferably concave and may be secured to the side members 10 of the digger by brackets 67 or otherwise. Also as indicated in Fig. 1, the cross frame 45 may have connected thereto a stop plate 68. The stop plate is made of steel or other suitable material, or constructed in any other suitable way. As will be apparent, in order to maintain the proper tension on the chain 50, I may employ a bracket 69 fitted with a roller 70 both of which are adjustable to position in the support bar 44 to which they are secured.

In the operation of the potato digger hereinbefore described, the potatoes and earth are removed from the ground by the plow 21 and carried to the conveyer by which they are elevated and on which the earth is loosened and shakened from the potatoes. It will be furthermore understood that the potatoes and vines or the greater majority of them will be delivered from the conveyer by falling to the receiving plate 66, although some of the potatoes may be carried over so as to fall upon the cover 60 carried by the revoluble delivery devices, while the vines are guided by the stop plate 68. All the potatoes however will be delivered upon the receiving plate 66 from which they are carried by the finger 63 as the same pass along the concave surface so that the potatoes will be delivered therefrom in rows in the predetermined position at the side of the digger while the same disposition will be made of the vines by the projecting ends of the arms 59. Furthermore, as will be understood, the revoluble member of the delivery devices may be made to turn in either direction by shifting the gears 51 and 52 so that if desired in operating the digger, the potatoes may be elevated from the digger in consecutive rows while traveling back and forth.

I claim as my invention:

1. In a potato digger, the combination with devices for removing the potatoes from the ground and conveying the same to an elevated position, and a plate upon which the potatoes are deposited at the rear of the said devices, of a delivery apparatus comprising a revoluble member operating in its entirety above the said plate, and a plurality of fingers forming part of the said revoluble member and coöperating with the said plate to remove the potatoes therefrom and deposit the same in a continuous row at one side of the digger.

2. In a potato digger, the combination with devices for removing potatoes from the ground and conveying the same to an elevated position and a plate upon which the potatoes are received from the conveying devices, of a delivery apparatus, comprising a revoluble member, a plurality of fingers carried by the revoluble member for coöperating with the said plate to remove the potatoes therefrom and deposit the same at the side of the digger, and a plurality of arms also carried by the said revoluble member and coöperating with the said plate to remove potatoes and vines therefrom and deposit them at the side of the digger.

3. In a potato digger, the combination with a device for removing potatoes from the ground and conveying the same to an elevated position and a plate upon which the potatoes are received from the said conveying devices, of a delivery device coöperating with the said conveying devices for directing the potatoes to the said plate and comprising a revoluble head having projections extending therefrom, ring members connected to the said projections, a plurality of fingers fixed in and extending from the said ring members and adapted to coöperate with the said plate to remove the potatoes therefrom and deposit them in a row at the side of the digger.

4. In a potato digger, the combination with devices for removing potatoes from the ground and conveying the same to an elevated position and a plate upon which the said potatoes are received from the conveying devices, of a delivery apparatus coöperating with the said conveying devices for directing the potatoes to the said plate and comprising a revoluble head having projections extending therefrom, a plurality of arms each of which is connected to and extends beyond one of the said projections, ring members secured to the said projections, and a plurality of fingers secured in and extending from the said ring members, the said fingers and arms coöperating with the said plate to remove the potatoes and vines therefrom and deposit the same at the side of the digger.

5. In a potato digger, the combination with a frame, traction wheels, an axle upon which the traction wheels are mounted and to which the frame is secured, devices for removing potatoes from the ground and conveying the same to an elevated position and a receiving plate upon which the potatoes are deposited from the said conveying devices, of a cross frame mounted at the rear of the aforesaid frame, a shaft mounted in the cross frame, means for driving the said shaft from the axle, a spindle driven from the said shaft, a head member connected to the said spindle and having projections extending therefrom, an arm secured to and extending appreciably beyond the end of the said projections, ring members secured in the said projections and a plurality of fingers mounted in the said ring members, the extremities of the said arms and fingers coöperating with the said plate to remove the potatoes and vines therefrom and deposit the same at the side of the digger.

6. In a potato digger, the combination with devices for removing potatoes from the ground and conveying the same to an elevated position and a plate upon which the potatoes are received from the conveying devices, of a delivery device, comprising a revoluble head having projections extending therefrom, a plurality of arms, each of which is connected to and extend beyond one of the said projections, and a plurality of fingers secured in and extending from the said head, the said fingers and arms coöperating with the said plate to remove the potatoes and vines therefrom and deposit the same at one side of the digger.

7. In a potato digger, the combination with a frame, traction wheels, an axle upon which the traction wheels are mounted and to which the frame is secured, devices for removing potatoes from the ground and conveying the same to an elevated position and a receiving plate upon which the potatoes are deposited from the said conveying devices, of a cross frame mounted at the rear of the aforesaid frame, a shaft mounted in the cross frame, means for driving the shaft from the axle, a spindle driven from the said shaft, a head member connected to the said spindle and having projections extending therefrom, an arm secured to and extending appreciably beyond the end of each projection, and a plurality of fingers mounted on the said head, the extremities of the said arms and fingers coöperating with the said plate to remove the potatoes and vines therefrom and deposit the same at the side of the digger.

Signed by me this 20th day of January, 1919.

LEWIS AUGUSTUS ASPINWALL.

Copies of this patent may be obtained for five cents each, by addressing the "Commissioner of Patents, Washington, D. C."